(12) United States Patent
Zhang (10) Patent No.: US 8,762,748 B1
(45) Date of Patent: *Jun. 24, 2014

(54) APPARATUS AND METHODS FOR POWER SAVING IN USB DEVICES

(75) Inventor: Zhenyu Zhang, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/595,433

(22) Filed: Aug. 27, 2012

Related U.S. Application Data (63) Continuation of application No. 12/188,841, filed on Aug. 9, 2008, now Pat. No. 8,255,708.

(60) Provisional application No. 60/955,199, filed on Aug. 10, 2007.

(51) Int. Cl.
| | | |
|---|---|---|
| *G06F 1/00* | (2006.01) | |
| *G06F 1/26* | (2006.01) | |
| *G06F 1/32* | (2006.01) | |
| *G06F 11/30* | (2006.01) | |

(52) U.S. Cl.
USPC ............................ 713/300; 713/320; 713/340

(58) Field of Classification Search
USPC .................................................. 713/300–340
See application file for complete search history.

(56) References Cited

U.S. PATENT DOCUMENTS

| | | | |
|---|---|---|---|
| 5,471,625 A | | 11/1995 | Mussemann et al. |
| 5,638,083 A | * | 6/1997 | Margeson ........................ 345/10 |
| 5,784,581 A | | 7/1998 | Hannah |
| 5,918,058 A | | 6/1999 | Budd |
| 6,122,749 A | * | 9/2000 | Gulick .......................... 713/324 |
| 6,226,701 B1 | | 5/2001 | Chambers et al. |

(Continued)

FOREIGN PATENT DOCUMENTS

| | | | | |
|---|---|---|---|---|
| EP | 2291720 A1 | * | 3/2011 | ................ G06F 1/32 |
| JP | 05300060 A | | 11/1993 | |

(Continued)

OTHER PUBLICATIONS

Tan Thiam Loong; bin Abu Hassan, A.H.; Chua Han Kung, "Power management for USB2.0 5V supply using load resistive and switch capacitive detection approach," Intelligent and Advanced Systems (ICIAS), 2012 4th International Conference on , vol. 1, pp. 461,466, Jun. 12-14, 2012.*

(Continued)

*Primary Examiner* — Faisal M Zaman (57) ABSTRACT

A bus clock period, corresponding to a wired communication bus connecting a first device to a second device, is measured at the first device. A first time period, for the first device to enter a first reduced power mode, is determined at the first device. A second time period, for the wired communication bus to enter a second reduced power mode, is determined at the first device, the second time period being based on i) the first time period and ii) the bus clock period. A request, for the wired communication bus to enter the second reduced power mode during the second time period, is sent from the first device to the second device via the wired communication bus. The first device enters the first reduced power mode in response to the first device receiving a reply to the request from the second device via the wired communication bus.

30 Claims, 8 Drawing Sheets

(56) References Cited

U.S. PATENT DOCUMENTS

| | | | |
|---|---|---|---|
| 6,275,920 B1* | 8/2001 | Abercrombie et al. | 712/14 |
| 6,308,215 B1 | 10/2001 | Kolbet et al. | |
| 6,553,501 B1 | 4/2003 | Yokoe | |
| 6,622,251 B1 | 9/2003 | Lindskog et al. | |
| 6,715,095 B1 | 3/2004 | Larsen et al. | |
| 6,775,785 B1 | 8/2004 | Hart et al. | |
| 6,882,952 B1 | 4/2005 | Hadley et al. | |
| 7,000,131 B2 | 2/2006 | Miller et al. | |
| 7,158,245 B2 | 1/2007 | Qiao | |
| 7,383,457 B1 | 6/2008 | Knight | |
| 7,457,943 B2 | 11/2008 | Hiramatsu et al. | |
| 7,475,265 B2 | 1/2009 | Oshikawa et al. | |
| 7,490,255 B2 | 2/2009 | Diefenbaugh et al. | |
| 7,500,119 B2 | 3/2009 | Tsai | |
| 7,555,578 B2 | 6/2009 | Lim et al. | |
| 7,684,835 B1 | 3/2010 | Vu et al. | |
| 7,689,849 B2 | 3/2010 | Sokorac | |
| 7,698,490 B2* | 4/2010 | Terrell, II | 710/302 |
| 7,752,473 B1 | 7/2010 | Kwa et al. | |
| 7,904,625 B1 | 3/2011 | Jiang et al. | |
| 7,971,079 B2 | 6/2011 | Ezura | |
| 8,064,411 B2* | 11/2011 | Ecclesine | 370/337 |
| 2002/0083354 A1* | 6/2002 | Adachi | 713/322 |
| 2002/0091953 A1 | 7/2002 | Min | |
| 2003/0101362 A1* | 5/2003 | Dia | 713/300 |
| 2003/0140263 A1* | 7/2003 | Arends et al. | 713/320 |
| 2003/0172310 A1* | 9/2003 | Moyer et al. | 713/300 |
| 2004/0044915 A1* | 3/2004 | Bose et al. | 713/320 |
| 2004/0083397 A1* | 4/2004 | Chen | 713/320 |
| 2004/0221187 A1* | 11/2004 | Durand et al. | 713/300 |
| 2004/0230850 A1* | 11/2004 | Baumgartner et al. | 713/320 |
| 2005/0009512 A1* | 1/2005 | Rue | 455/420 |
| 2005/0091549 A1* | 4/2005 | Wu et al. | 713/320 |
| 2005/0108455 A1* | 5/2005 | Miller et al. | 710/113 |
| 2005/0160196 A1* | 7/2005 | Dutton et al. | 710/10 |
| 2005/0268010 A1 | 12/2005 | Igari | |
| 2006/0005058 A1 | 1/2006 | Chen et al. | |
| 2006/0041766 A1* | 2/2006 | Adachi | 713/322 |
| 2006/0069930 A1* | 3/2006 | Dixon et al. | 713/300 |
| 2006/0179336 A1* | 8/2006 | Rose et al. | 713/320 |
| 2006/0265617 A1* | 11/2006 | Priborsky | 713/320 |
| 2006/0294404 A1* | 12/2006 | Ho | 713/300 |
| 2007/0022309 A1* | 1/2007 | Adamo et al. | 713/300 |
| 2007/0103195 A1 | 5/2007 | Duk-Sohn et al. | |
| 2007/0143637 A1 | 6/2007 | Tsai | |
| 2007/0147330 A1* | 6/2007 | Smith et al. | 370/346 |
| 2007/0201413 A1* | 8/2007 | Laine et al. | 370/338 |
| 2007/0226385 A1 | 9/2007 | Liu et al. | |
| 2007/0283174 A1* | 12/2007 | Okazaki | 713/300 |
| 2007/0300084 A1* | 12/2007 | Goodrum et al. | 713/300 |
| 2007/0300085 A1* | 12/2007 | Goodrum et al. | 713/300 |
| 2008/0005432 A1 | 1/2008 | Kagawa | |
| 2008/0005445 A1 | 1/2008 | Diefenbaugh et al. | |
| 2008/0178011 A1* | 7/2008 | Hubo et al. | 713/300 |
| 2008/0178026 A1* | 7/2008 | Chen | 713/323 |
| 2008/0195782 A1 | 8/2008 | Yi | |
| 2009/0222685 A1 | 9/2009 | Foster et al. | |
| 2011/0015918 A1 | 1/2011 | Kalbarga | |

FOREIGN PATENT DOCUMENTS

| | | |
|---|---|---|
| JP | 2001014107 A | 1/2001 |
| JP | 2004078737 A | 3/2004 |
| JP | 2005328439 A | 11/2005 |
| JP | 2006198794 A | 8/2006 |
| WO | WO-2008087565 A1 | 7/2008 |

OTHER PUBLICATIONS

Ju-Yong Kim; June-Whan Choi; Kyoung Choi, "Design of automatic energy saving-monitor for reducing the waste of PC electricity," Networked Computing (INC), 2011 the 7th International Conference on , pp. 28,31, Sep. 26-28, 2011.*

Ching-Chang Wong; Chih-Cheng Liu; Kuei-Chih Hou, "DC power supply system for intelligent server," Intelligent Signal Processing and Communications Systems (ISPACS), 2012 International Symposium on , pp. 245,249, Nov. 4-7, 2012.*

Hathaway et al., "Advanced Low Power System Design Techniques using the Universal Serial Bus Microcontroller," Northcon/96, pp. 270-274, Nov. 4-6, 1996.

Rong et al., "Hierarchical Power Management with Application to Scheduling," Proceedings of the 2005 International Symposium on Low Power Electronics and Design, ISLPED '05, pp. 269-274, Aug. 8-10, 2005.

Pei et al., "Development of a USB-Based Programmable SDLC Measurement Unit," Ninth International Conference on Electronic Measurement & Instruments, ICEMI '09, pp. 3-96 to 39-9, Aug. 16-19, 2009.

Bai et al., "Measurement and Improvement of Power Consumption for Portable Computers," Proceedings of the Ninth International Symposium on Consumer Electronics, 2005. (ISCE 2005), pp. 122-127, Jun. 14-16, 2005.

* cited by examiner

APPARATUS AND METHODS FOR POWER SAVING IN USB DEVICES

CROSS-REFERENCE TO RELATED APPLICATIONS

This application is a continuation of U.S. patent application Ser. No. 12/188,841, entitled "Apparatus and Methods for Power Saving in USB Devices", filed on Aug. 9, 2008, now U.S. Pat. No. 8,255,708, which claims the benefit of U.S. Provisional Application No. 60/955,199, filed Aug. 10, 2007. The contents of both of the above-identified patent applications are hereby incorporated by reference herein in their entireties.

FIELD OF TECHNOLOGY

The present disclosure generally relates to the field of universal serial bus (USB) device interfaces. More specifically, embodiments disclosed herein generally relate to circuits, architectures, systems, methods, algorithms and software for reducing power consumption of a USB device.

BACKGROUND

The Universal Serial Bus generally provides a host controlled interface for communication between a host and one or more peripheral devices using standardized interface sockets. There is generally only one host per bus. The USB host is responsible for undertaking all transactions and scheduling bandwidth. Data can be sent by various transaction methods using a token-based protocol.

USB is generally designed for a personal computer host, such as a desktop or laptop computer. However, due to the wide popularity and interoperability of USB devices, many more types of systems are being used and/or considered as USB hosts. An increasing number of mobile telephone handsets and other battery-operated handheld mobile devices may function as both a USB host (in order to use USB peripheral devices) and as a peripheral device (in order to synchronize data with and/or otherwise communicate with a conventional personal computer or similar device). For example, a mobile phone or other handheld mobile device may function as a USB host in order to use a USB adapter for a wireless local area network (WLAN) or other wireless communication system.

However, USB has some disadvantages for power management in a small battery-powered device. A conventional USB device will enter suspend when there is no activity on the bus for greater than 3.0 ms. The device then has a further 7 ms to shutdown the device and draw no more than the designated suspend current from the bus 10 mS after bus activity has stopped. In order to stay connected to a suspended hub or host, the device must still provide power to its pull up speed selection resistors during the suspend mode. At the host, both of the data lines have pull-down resistors of 15K ohms. For the purposes of power consumption, the pull down resistor at the device is in series with the 1.5K ohms pull up, for a total load of 16.5K ohms, usually at a voltage of 3.3 v. Therefore each conventional device consumes at least 200 uA during the suspend mode. Thus suspend current is relatively small for a laptop or desktop computer, but is a significant drain on a small handheld battery-operated device such as a mobile phone or personal organizer and will adversely affect the operating life of the battery.

In addition, a conventional USB device may need 30 ms or more to resume from a suspend mode. In some applications, however, a USB device may need to periodically enter and exit a power saving mode of operation. For example, a WLAN device in a power saving mode may need to listen for a Delivery Traffic Indicator Message (DTIM) every 100 ms (or other DTIM beacon indicator specified by a wireless access point). Thus, the USB bus may also need to wake at this time in order to send any messages received to the host device (e.g., for processing by a WLAN device driver on the host). As a result, a USB device may spend a large portion of any "idle" time simply entering and exiting from suspend mode, thereby significantly reducing any power savings of entering suspend mode.

Therefore, it is desirable to provide for reduced power consumption of a USB device in a power saving mode of operation to provide faster response during periodic states of activity and inactivity.

SUMMARY OF THE DISCLOSURE

In one embodiment, a method includes measuring, at a first device, a bus clock period, wherein the bus clock period corresponds to a wired communication bus connecting the first device to a second device. The method also includes determining, at the first device, a first time period in which the first device is to enter a first reduced power mode, and determining, at the first device, a second time period in which the wired communication bus is to enter a second reduced power mode, wherein the second time period is based on i) the first time period and ii) the bus clock period. Additionally, the method includes sending, via the wired communication bus, a request from the first device to the second device, wherein the request is for the wired communication bus to enter the second reduced power mode during the second time period. The method further includes causing, at the first device, the first device to enter the first reduced power mode during the first time period in response to the first device receiving a reply to the request, wherein the reply is received from the second device via the wired communication bus.

In another embodiment, an apparatus comprises a bus interface device coupled to a wired communication bus, the bus interface device communicatively coupled to a first device via the wired communication bus. The bus interface device is configured to measure a bus clock period of the wired communication bus, and determine a first time period in which the bus interface device is to enter a first reduced power mode. The bus interface device is also configured to determine, based on the first time period and the bus clock period, a second time period in which the wired communication bus is to enter a second reduced power mode, and send a request to the first device via the wired communication bus, wherein the request is for the wired communication bus to enter the second power save mode for the second time period. Additionally, the bus interface device is configured to cause the bus interface device to enter the first reduced power mode for the first time period in response to the bus interface device receiving a reply to the request, the reply received by the bus interface device from the first device via the wired communication bus.

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the embodiments of the present invention, numerous specific details are set forth in order to provide a thorough understanding of the embodiments of the present invention. However, it will be readily apparent to one skilled in the art that the embodiments of the present invention may be practiced without these specific details. In other instances, well-known methods, procedures, components, and circuits have not been described in detail so as not to unnecessarily obscure aspects of the embodiments of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings.

The invention, in its various aspects, will be explained in greater detail below with regard to exemplary embodiments.

An Exemplary Circuit and/or Architecture

Figure 1:
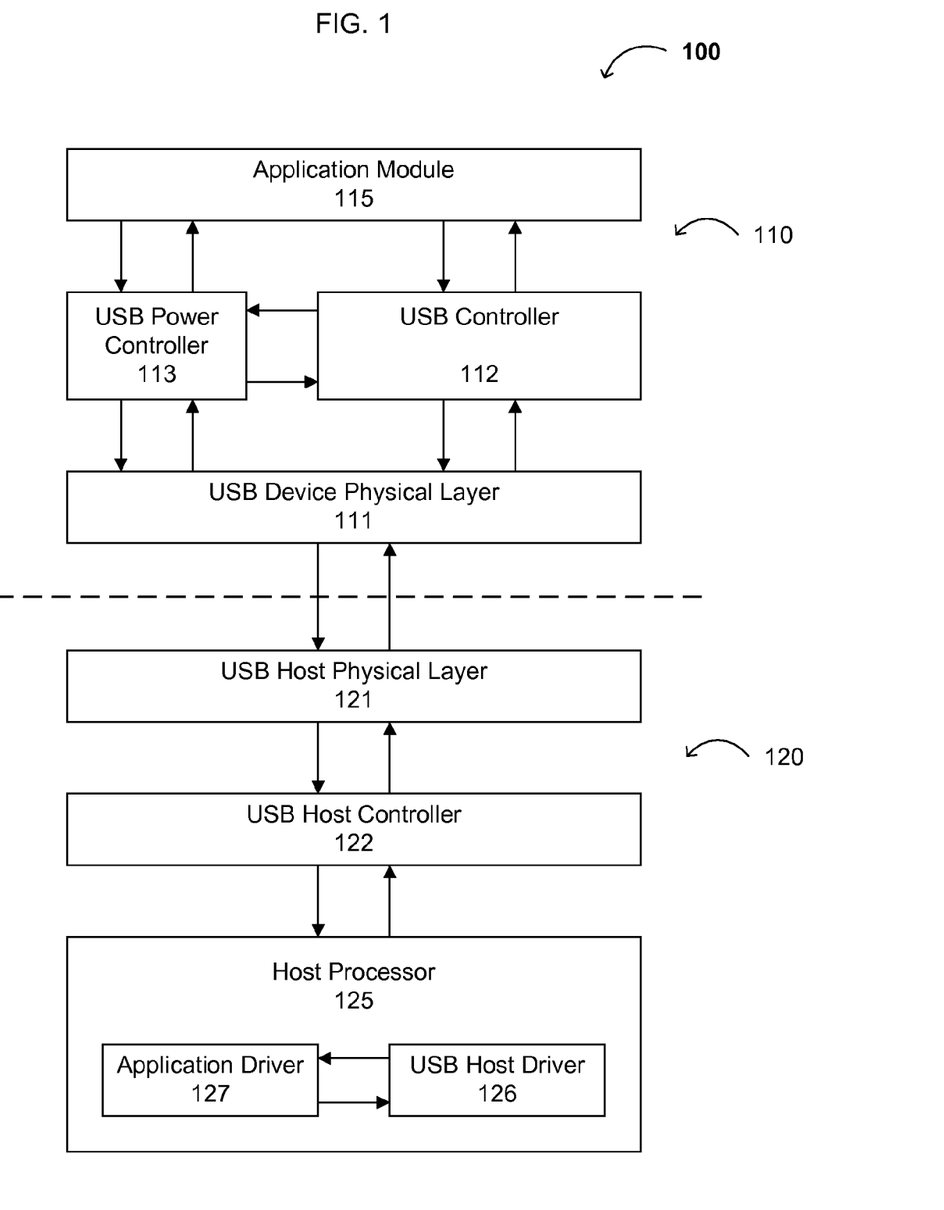
FIG. 1 is a diagram showing a USB host device and a USB peripheral device with a power control circuit according to embodiments of the present invention.

FIG. 1 shows an exemplary system with USB host 120 and USB device 110. The host device 120 may be a desktop or laptop computer, a mobile phone or other handheld mobile device, or any other suitable host. The host generally includes a host physical layer (or "PHY") 121, a host controller 122 (e.g., a "firmware" or other programmable device for controlling the USB bus) and a host processor 125. The host processor may include one or more central processing units (CPUs) and/or other processing devices. The host processor or processors are generally configured to execute a host operating system (e.g., Windows XP, MacOS, UNIX, Linux, etc.), applications, and device drivers including USB host drivers and drivers for one or more USB peripheral devices. The peripheral device drivers may include "generic" drivers for devices that conform to one or more pre-defined USB device standards and/or customized devices for non-standard devices and/or for enhanced functionality.

USB device 110 generally includes a USB device physical layer 111, USB controller and/or interface 112, and application module 115. The device may also include USB power controller 113 for reducing the power consumption of the device. Power controller 113 may include specialized circuitry and/or "firmware" executed by controller 112. Physical layer 111, controller 112, and power controller 113 may be implemented in a single integrated circuit device and/or die and/or in multiple interoperating integrated circuit devices (e.g., general purpose microprocessors, system-on-chip [SOC] devices, application specific integrated circuits [ASICs], etc.).

Application module 115 generally includes circuitry and/or instructions for performing the application-specific functionality of the USB peripheral device 120. For example, in a wireless network adapter application module 115 may include a radio frequency (RF) module and firmware and/or other circuits for communicating with remote devices over the wireless network. Wireless network modules may include, for example, personal area network (e.g., Bluetooth) modules, wireless local area network (e.g., IEEE 802.11a/b/g/n) modules, wireless wide area network (e.g., Wi-Max, GPRS, EDGE, EV-DO, etc.) module, etc.

Figure 2:
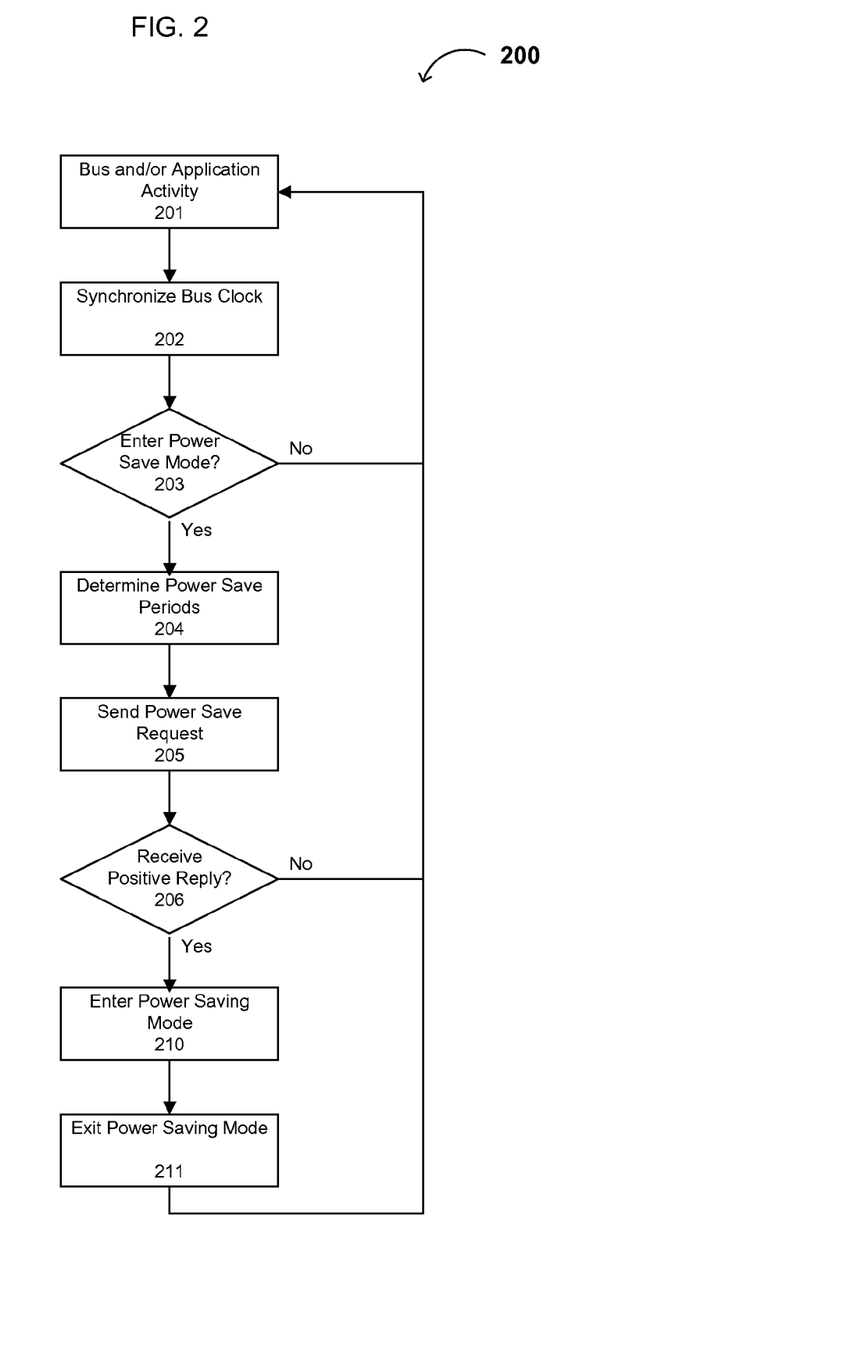
FIG. 2 is a flowchart showing an exemplary method for reducing power consumption in a USB device according to embodiments of the present invention.

FIG. 2 shows an exemplary method 200 for reducing power consumption of USB device 110. At step 201, normal USB bus activity and application activity occur. Thus, the USB device and/or the application module may operate in a non-power saving mode (e.g., to transfer data to or from the USB bus, to communicate with remote devices over a wireless network, etc.). During the normal and/or non-power-saving mode, power controller 113 may sample, synchronize with, or otherwise measure the USB bus clock.

In the USB clock domain, the USB host is clock master. According to the USB specification, the accuracy of the bus clock should be ±500 ppm. The USB host generally advertises the bus clock with start-of-frame (SoF) packets. Each SoF packet has an 11-bit frame number. At full-speed (USB-FS), the SoF is sent every 1.000 ms±500 ns. At high speed (USB-HS) eight micro-frames are sent for each frame, so that the SOF packet is repeated every 125.0 μs±62.5 ns. Thus, the host controller may adjust the SoF interval a few bits every millisecond. With a tolerance of ±500 ppm, the clock may drift up to 50 μs over a 100 ms window). By synchronizing the device clock with the SoF interval, USB device 110 can ensure that any time-dependent requests sent to the host accurately reflect the timing on the bus clock. As long as the synchronization activity lasts at least 2 ms, at least two full speed SoF packets and/or 16 high speed SoF packets can be received. Thus, the USB device can obtain a good knowledge of the bus clock during even relatively short periods of activity.

At step 203 the device may decide to enter a power saving mode of operation. The device may, for example, enter a power saving mode of operation when the USB bus has been idle for a period of time, when the application module has been idle for a time, when the application module sends a request to enter a power saving mode, etc. At step 204 the device determines a duration for the power saving mode. For example, the application module may have a preferred and/or requested start time, end time, duration, etc. for a power saving mode. Step 204 may also include determining a bus power saving period based on the application's desired power save period and/or the corrected SoF interval for the USB bus. For example, based on the application's desired power save period and the amount of time needed to enter and/or resume the bus power saving mode, the USB device may calculate frame numbers corresponding to a desired bus power save start time and end time.

At step 205, the device sends a request to the host to begin the power saving mode. The request generally includes one or more values corresponding to the desired bus power save period (e.g., a start time, duration, etc.). These values may, for example, include frame numbers corresponding to a start time and an end time and/or other values calculated in terms of the corrected bus clock. The request may include a start time and/or an end time of the bus power save period in terms of the bus clock At step 206, the USB device controller 112 may determine whether the host has replied positively. Step 206 may make a positive determination and proceed to step 210 when a positive reply is received. Alternatively, step 206 may make a negative determination and continue bus activity either when a negative reply has been received and/or when no reply has been received within a predetermined time.

At step 210, the USB device 110 (e.g., in response to a command, signal, instruction, etc. from USB power controller 113) enters the power saving mode of operation. For example, power control module 113 may reduce the power consumption of USB physical layer module 111, application module 115 (e.g., by disabling or causing to be disabled a radio frequency component and/or other components of the application module) and/or other components, circuits, and/ or modules during the power saving mode of operation.

For example, the power control module may be configured to place the USB physical layer module and/or other USB interface components in a high speed idle mode (e.g., in order to consume less leakage current than a conventional USB full speed suspend mode) during the power saving mode of operation. In response to the power save request, the USB host 120 may be configured (e.g., in firmware, hardware, software driver execution, etc.) to leave the device 110 in the high speed idle mode during the power saving mode of operation and to suspend communication with the device 110 during the power saving mode of operation (e.g., by queuing requests for communication until the power saving mode is scheduled to end).

At step 211, the device exits the power saving mode of operation. The device may exit the power saving mode in response to a message from the host (e.g., at a predetermined time requested by the device) and/or independently. The device then may return to an active mode at step 201. The active mode may be a brief waking period (e.g., long enough to re-synchronize the bus clock, poll the USB host and/or the application module for messages and/or activity, etc.) before resuming the power saving method at step 203, or may continue indefinitely.

Another Exemplary Method

Figure 3:
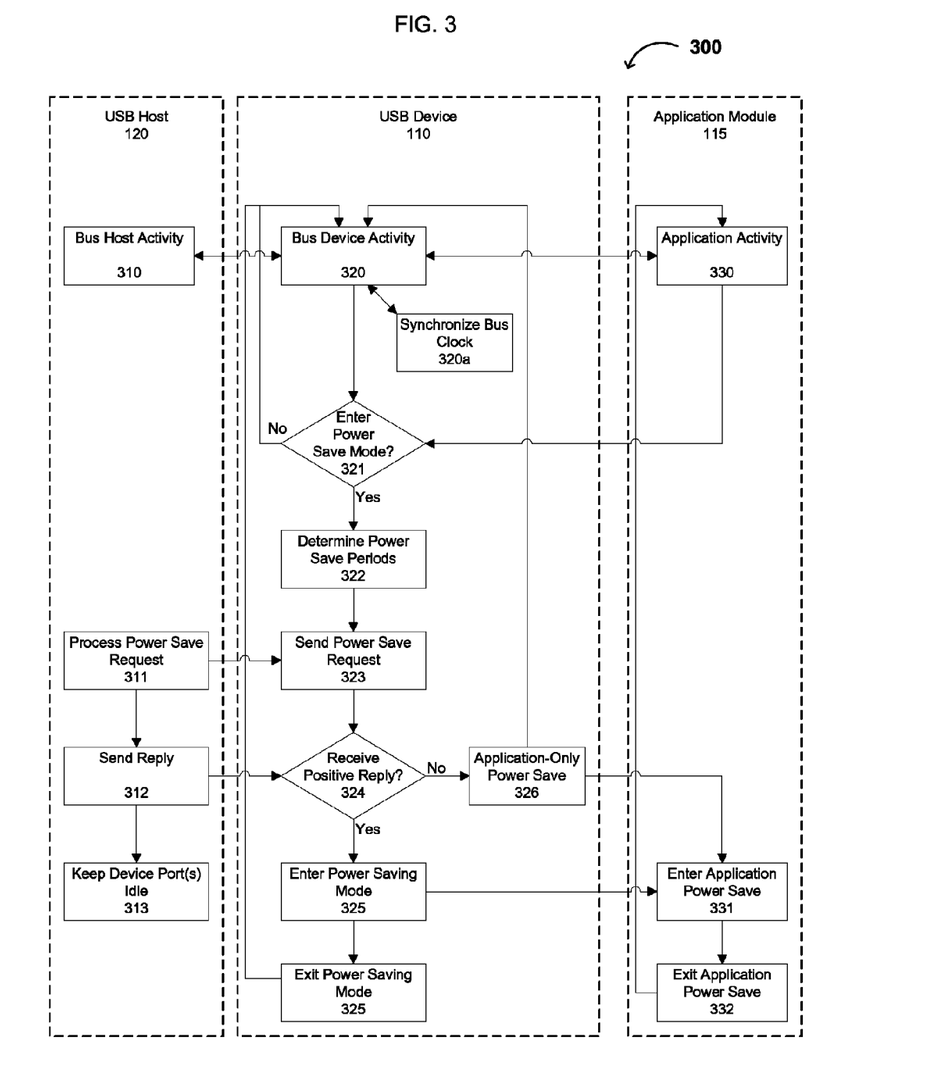
FIG. 3 is a flowchart showing a method of operation in an exemplary system with a host device and a USB device having according to embodiments of the present invention.

FIG. 3 shows a flowchart of method 300 with respect to exemplary operations of USB host 120, USB device 110, and application module 115. At steps 310, 320, and 330, normal USB bus activity and application activity occur. Thus, USB device 110 and/or application module 115 may operate in a non-power saving mode (e.g., to transfer data to or from the USB bus, to communicate with remote devices over a wireless network, etc.). At step 320a during the normal and/or non-power-saving activity 320 of USB 110, power controller 113 may sample, synchronize with, or otherwise measure the USB bus clock.

At step 321 device 110 may decide to enter a power saving mode of operation. The device may, for example, enter a power saving mode of operation when the USB bus has been idle for a period of time, when the application module has been idle for a time, when the application module sends a request to enter a power saving mode, etc. At step 321 the device determines a duration for the power saving mode. For example, the application module may have a preferred and/or requested start time, end time, duration, etc. for a power saving mode. Step 321 may also include determining a bus power saving period based on the application's desired power save period and/or the corrected SoF interval for the USB bus. For example, based on the application's desired power save period and the amount of time needed to enter and/or resume the bus power saving mode, the USB device may calculate frame numbers corresponding to a desired bus power save start time and end time.

At step 323, the device sends a request to the host to begin the power saving mode. The request generally includes one or more values corresponding to the desired bus power save period (e.g., a start time, duration, etc.). These values may, for example, include frame numbers corresponding to a start time and an end time and/or other values calculated in terms of the corrected bus clock. The request may include a start time and/or an end time of the bus power save period in terms of the bus clock.

At step 311, USB host 120 receives and processes the power save request from USB device 110. The request may be processed by the host firmware 122 and/or by host processor 125 in accordance with application driver 127 and/or USB host driver 126. At step 312 the host sends a reply to device 110, then at step 313 leaves the device in the high speed idle mode and suspends communication with the device (e.g., by queuing requests for communication until the power saving mode is scheduled to end) during the power saving mode of operation.

The request and/or the host's reply to the request may comprise USB isochronous transfers. Isochronous transfers have a bounded latency and no delivery guaranty. Thus, the USB device can assume that the request will arrive at host controller 122 to be processed host processor 125, and that the reply will be received by a pre-determined time, or that no reply will be received at all. At step 324, the USB device controller 112 may determine whether the host has replied positively. Step 324 may make a positive determination and proceed to step 325 when a positive reply is received. Alternatively, step 324 may make a negative determination and proceed to step 326 when a negative reply has been received and/or when no reply has been received within the bounded period for the isochronous transfers to occur.

If device 110 does not receive a positive reply, then device 110 may still enter a limited power saving mode of operation at step 326 by placing application module 115 in a power saving mode of operation at step 331 and returning USB controller 112 to an active mode at step 320. For example, device 110 may disable the application module 115 or specific components of application module 115. Device 110 may also queue or store any messages from the host device that are directed to the application module until the application module wakes. If device 110 does receive a positive reply, then device 110 (e.g., in response to a command, signal, instruction, etc. from USB power controller 113) enters the power saving mode of operation at step 325 and also places application module 115 in a power save mode of operation at step 331. For example, power control module 113 may reduce the power consumption of USB physical layer module 111, application module 115 (e.g., by disabling or causing to be disabled a radio frequency component and/or other components of the application module) and/or other components, circuits, and/or modules during the power saving mode of operation. Step 325 may further include placing the USB physical layer module 111 and/or other USB interface components in a high speed idle mode (e.g., in order to consume less leakage current than a conventional USB full speed suspend mode) during the power saving mode of operation.

At step 325, device 110 exits the power saving mode of operation and at step 332 application module 332 exits the power saving mode. Steps 332 and 325 may be substantially synchronized, although it will be recognized that in some applications (or when device 110 enters an application-only power save mode at step 326) the USB physical layer module 111 and/or the application module 115 may wake independently. The device may exit the power saving mode in response to a message from the host (e.g., at a predetermined time requested by the device), in response to an activity indication from application module 115, in response to an internal timer, etc. After exiting the power saving mode of operation, steps 310, 320, and 330, of normal USB bus activity and application activity occur. The active mode may be a brief waking period (e.g., long enough to re-synchronize the bus clock, poll the USB host and/or the application module for messages and/or activity, etc.) before resuming the power saving method at step 321, or may continue indefinitely.

An Exemplary Wireless Network Adapter

Figure 4:
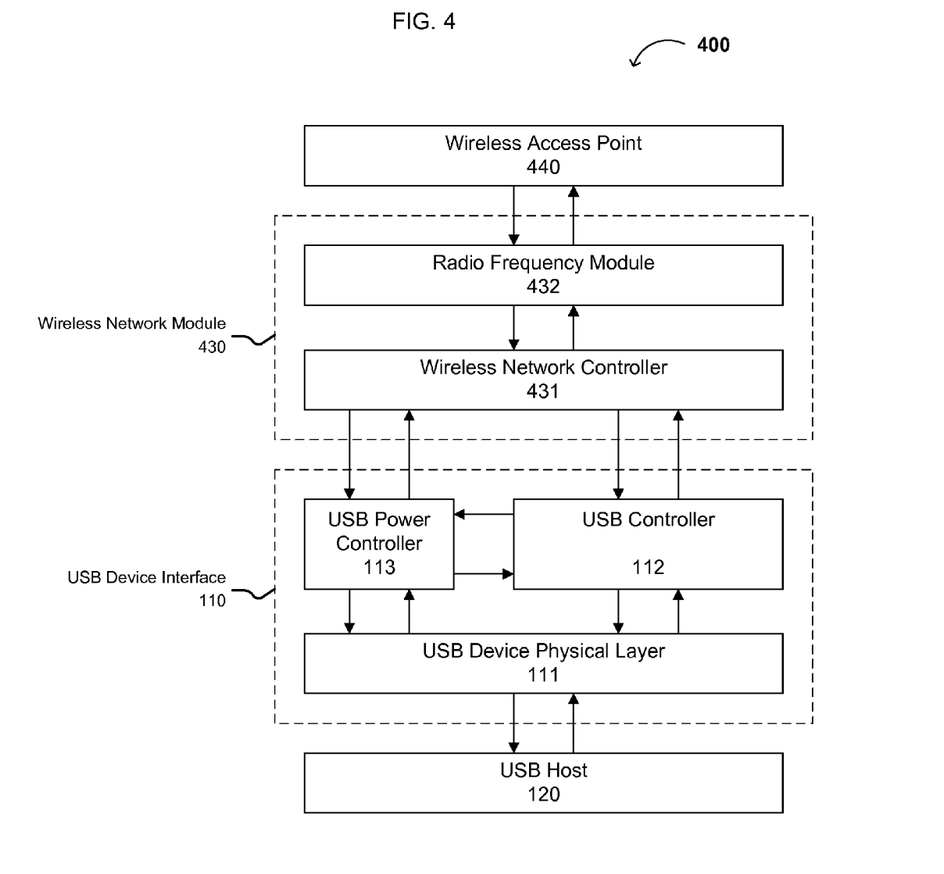
FIG. 4 is a diagram of an exemplary wireless network adapter.

FIG. 4 shows an exemplary wireless network adapter 400 (e.g., comprising USB driver interface 110 and wireless network module 430 in communication with USB host 120 and a wireless access point 440). For example, wireless network module 430 may implement or more wireless local area network (WLAN) protocols according to one or more of the IEEE 802.11a/b/g/n or similar specifications. Where the application module comprises a wireless network module, the application power save period may correspond to a traffic indicator beacon interval (e.g., a delivery traffic indicator message [DTIM] beacon interval).

A DTIM is a kind of traffic indication message which informs the clients about the presence of buffered and/or multicast/broadcast data on the access point. It is generated within the periodic beacon at a frequency specified by the DTIM Interval. Beacons are packets sent by an access point to synchronize a wireless network. After a DTIM, the access point will send the multicast/broadcast data on the channel following the normal channel access rules.

In a WLAN, the access point (AP) 440 is generally the clock master. The AP advertises clock information through the DTIM beacon, which generally includes a time synchronization function (TSF) header which describes a basic service set (BSS) clock in units of microseconds. The clock accuracy is generally 20 to 25 ppm. A wireless device complying with IEEE power saving protocols for WLANs generally sleeps (e.g., entering a power saving mode of operation) in between the expected arrival times for DTIM beacon. Generally, the interval between DTIM beacons is approximately 100 ms, although this value may be user configured at the access point 440. Thus, the wireless network module 430 may be configured to obtain the beacon interval from a wireless access point.

USB power controller 113 may then determine a bus power save period that coincides with the DTIM interval (e.g., based on a measurement of the USB bus clock) and send a power save request to USB host as described herein. Wireless module 430 will generally become active (e.g., by activating radio frequency module 432 and wireless network controller 431) in order to listen for a DTIM. Power control module 113 may, for example, be configured to synchronize the wake period of the USB bus with traffic indicator beacon listening periods, such that power controller 113 has sufficient time to receive at least two start-of-frame (SoF) packets from the host and re-synchronize the bus clock.

Exemplary Software

Embodiments of the present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, embodiments of the invention may further relate to a computer program, computer-readable medium, or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

Exemplary waveforms are generally configured for transmission through an appropriate medium, such as copper wire, a conventional twisted pair wire-line, a conventional network cable, a conventional optical data transmission cable, or even air or a vacuum (e.g., outer space) for wireless signal transmissions. The waveforms and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

The codes and/or instructions may directly implement the operations described here. Alternatively, one or more of the codes or instructions may be adapted to configure a device (e.g., a programmable circuit device) to form the circuits and/or components and/or to perform the operations described herein.

Exemplary Systems

The architectures, apparatuses, and/or systems generally comprise those that include a circuit embodying one or more of the inventive concepts disclosed herein. Embodiments of the present invention may include one or more integrated circuit devices (e.g., general purpose microprocessors, system-on-chip [SOC] devices, application specific integrated circuits [ASICs], etc.) or other apparatuses that include the circuits and/or perform the operations described herein. An exemplary wireless network adapter may include at least one such integrated circuit with a USB physical layer module, a connection to a USB bus (e.g., through a USB plug receptacle or a permanent connection to a host device), and a wireless network module (e.g., on the same integrated circuit device and/or on one or more communicatively coupled integrated circuit devices). An exemplary wireless network node may include such a wireless network adapter in addition to the USB host. The USB host may include a USB host interface and a host processor adapted to execute a USB interface driver and/or a wireless network driver.

A further aspect of the invention concerns a network, comprising a plurality of the present systems, communicatively coupled to each other; and a plurality of storage or communications devices, wherein each storage or communications device is communicatively coupled to one of the systems. The network may be any kind of known network, such as a storage network (e.g., RAID array), Ethernet, wireless network, etc. Wireless networks may include, but are not limited to, personal area networks (e.g., Bluetooth), wireless local area networks (e.g., IEEE 802.11a/b/g/n), wireless wide area networks (e.g., Wi-Max, GPRS, EDGE, EV-DO, etc.), etc.

Figure 5A:
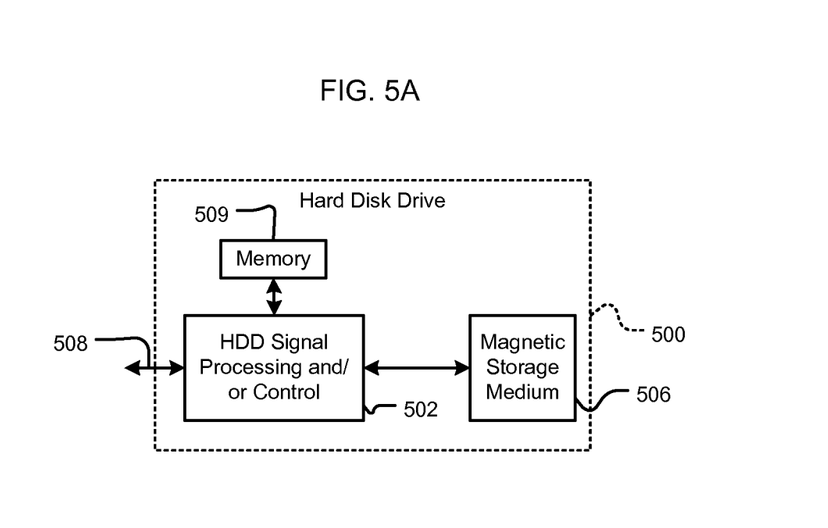
FIGS. 5A-5G are diagrams showing exemplary systems in which embodiments of the present invention may be used.

Various exemplary implementations of the present invention are shown in FIGS. 5A-5G. Referring now to FIG. 5A, embodiments of the present invention can be implemented in a hard disk drive (HDD) 500. Embodiments of the present invention may implement either or both signal processing and/or control circuits, which are generally identified in FIG. 5A at 502. In some implementations, the signal processing and/or control circuit 502 and/or other circuits (not shown) in the HDD 500 may process data, perform coding and/or encryption, perform calculations, and/or format data that is output to and/or received from a magnetic storage medium 506.

The HDD 500 may communicate with a host device (not shown) such as a computer, mobile computing devices such as personal digital assistants, cellular phones, media or MP3 players and the like, and/or other devices via one or more wired or wireless communication links 508, but in particular over a USB bus 508 wherein processing and/or control circuits 502 implement a USB device interface. The HDD 500 may be connected to memory 509 such as random access memory (RAM), nonvolatile memory such as flash memory, read only memory (ROM) and/or other suitable electronic data storage.

Figure 5B:
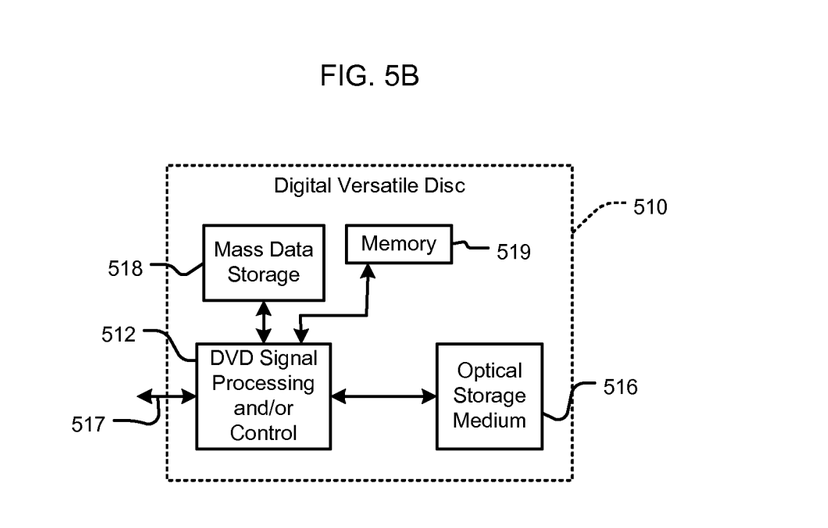

Referring now to FIG. 5B, embodiments of the present invention can be implemented in a digital versatile disc (DVD) drive 510. Embodiments of the present invention may implement either or both signal processing and/or control circuits, which are generally identified in FIG. 5B at 512, and/or mass data storage of the DVD drive 510. The signal processing and/or control circuit 512 and/or other circuits (not shown) in the DVD 510 may process data, perform coding and/or encryption, perform calculations, and/or format data that is read from and/or data written to an optical storage medium 516. In some implementations, the signal processing and/or control circuit 512 and/or other circuits (not shown) in the DVD 510 can also perform other functions such as encoding and/or decoding and/or any other signal processing functions associated with a DVD drive.

The DVD drive 510 may communicate with an output device (not shown) such as a computer, television or other device via one or more wired or wireless communication links 517, but in particular over a USB bus 517 wherein processing and/or control circuits 512 implement a USB device interface. The DVD 510 may communicate with mass data storage 518 that stores data in a nonvolatile manner. Thus, processing and/or control circuits 512 may also implement a USB host interface for communication with mass data storage 518. The mass data storage 518 may include a hard disk drive (HDD). The HDD may have the configuration shown in FIG. 5A. The HDD may be a mini HDD that includes one or more platters having a diameter that is smaller than approximately 1.8". The DVD 510 may be connected to memory 519 such as RAM, ROM, nonvolatile memory such as flash memory and/or other suitable electronic data storage.

Figure 5C:
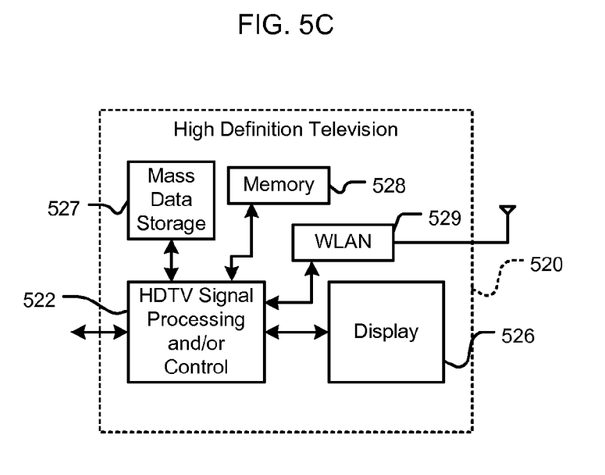

Referring now to FIG. 5C, embodiments of the present invention can be implemented in a high definition television (HDTV) 520. Embodiments of the present invention may implement either or both signal processing and/or control circuits, which are generally identified in FIG. 5E at 522, a WLAN interface and/or mass data storage of the HDTV 520. The HDTV 520 receives HDTV input signals in either a wired or wireless format and generates HDTV output signals for a display 526. In some implementations, signal processing circuit and/or control circuit 522 and/or other circuits (not shown) of the HDTV 520 may process data, perform coding and/or encryption, perform calculations, format data and/or perform any other type of HDTV processing that may be required.

The HDTV 520 may communicate with mass data storage 527 that stores data in a nonvolatile manner such as optical and/or magnetic storage devices. At least one HDD may have the configuration shown in FIG. 5A and/or at least one DVD may have the configuration shown in FIG. 5B. The HDD may be a mini HDD that includes one or more platters having a diameter that is smaller than approximately 1.8". The HDTV 520 may be connected to memory 528 such as RAM, ROM, nonvolatile memory such as flash memory and/or other suitable electronic data storage. The HDTV 520 also may support connections with a WLAN via a WLAN network interface 529. In particular, processing and/or control circuits 522 may implement a USB host interface to communicate over a USB bus with a USB device interface in WLAN 529.

Figure 5D:
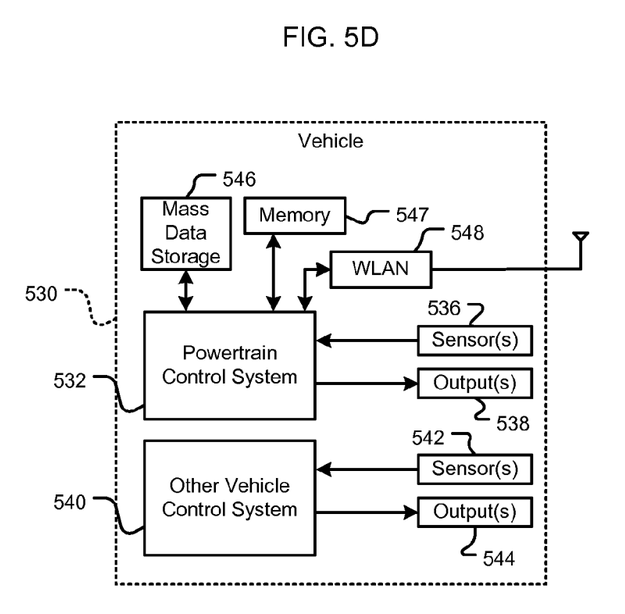

Referring now to FIG. 5D, embodiments of the present invention implements a control system of a vehicle 530, a WLAN interface and/or mass data storage of the vehicle control system. In some implementations, embodiments of the present invention implement a powertrain control system 532 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

Embodiments of the present invention may also be implemented in other control systems 540 of the vehicle 530. The control system 540 may likewise receive signals from input sensors 542 and/or output control signals to one or more output devices 544. In some implementations, the control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 532 may communicate with mass data storage 546 that stores data in a nonvolatile manner. The mass data storage 546 may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The powertrain control system 532 may be connected to memory 547 such as RAM, ROM, nonvolatile memory such as flash memory and/or other suitable electronic data storage. The powertrain control system 532 also may support connections with a WLAN via a WLAN network interface 548. The control system 540 may also include mass data storage, memory and/or a WLAN interface (all not shown). Powertrain control system 532 and/or control systems 540 may implement USB device and/or host interfaces. In particular, powertrain control system 532 may implement a USB host interface to communicate over a USB bus with a USB device interface in WLAN 548.

Figure 5E:
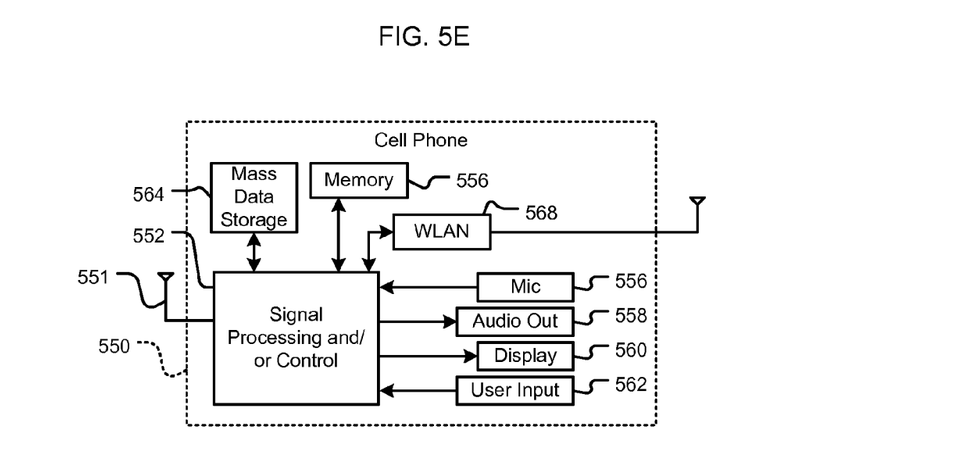

Referring now to FIG. 5E, embodiments of the present invention can be implemented in a cellular phone 550 that may include a cellular antenna 551. Embodiments of the present invention may implement either or both signal processing and/or control circuits, which are generally identified in FIG. 5E at 552, a WLAN interface and/or mass data storage of the cellular phone 550. In some implementations, the cellular phone 550 includes a microphone 556, an audio output 558 such as a speaker and/or audio output jack, a display 560 and/or an input device 562 such as a keypad, pointing device, voice actuation and/or other input device. The signal processing and/or control circuits 552 and/or other circuits (not shown) in the cellular phone 550 may process data, perform coding and/or encryption, perform calculations, format data and/or perform other cellular phone functions.

The cellular phone 550 may communicate with mass data storage 564 that stores data in a nonvolatile manner such as optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The cellular phone 550 may be connected to memory 566 such as RAM, ROM, nonvolatile memory such as flash memory and/or other suitable electronic data storage. The cellular phone 550 also may support connections with a WLAN via a WLAN network interface 568. In particular, processing and/or control circuits 552 may implement a USB host interface to communicate over a USB bus with a USB device interface in WLAN 568.

Figure 5F:
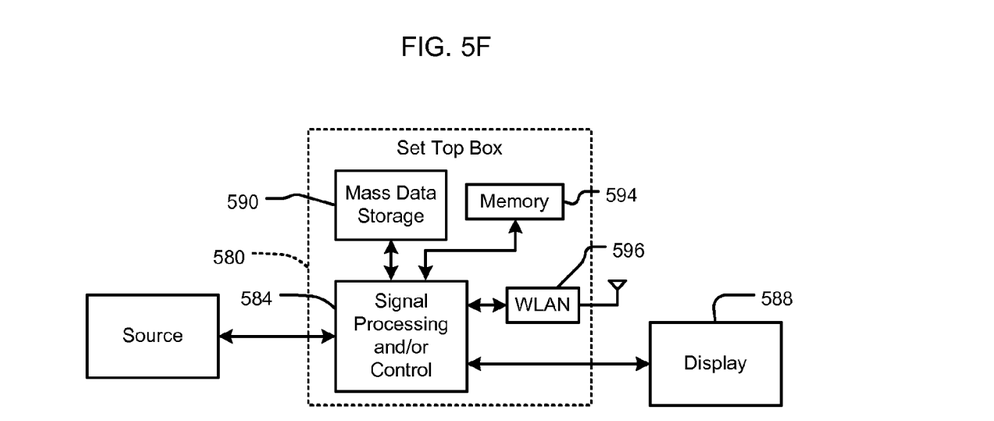

Referring now to FIG. 5F, embodiments of the present invention can be implemented in a set top box 580. Embodiments of the present invention may implement either or both signal processing and/or control circuits, which are generally identified in FIG. 5F at 584, a WLAN interface and/or mass data storage of the set top box 580. The set top box 580 receives signals from a source such as a broadband source and outputs standard and/or high definition audio/video signals suitable for a display 588 such as a television and/or monitor and/or other video and/or audio output devices. The signal processing and/or control circuits 584 and/or other circuits (not shown) of the set top box 580 may process data, perform coding and/or encryption, perform calculations, format data and/or perform any other set top box function.

The set top box 580 may communicate with mass data storage 590 that stores data in a nonvolatile manner. The mass data storage 590 may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The set top box 580 may be connected to memory 594 such as RAM, ROM, nonvolatile memory such as flash memory and/or other suitable electronic data storage. The set top box 580 also may support connections with a WLAN via a WLAN network interface 596. In particular, processing and/or control circuits 584 may implement a USB host interface to communicate over a USB bus with a USB device interface in WLAN 596.

Figure 5G:
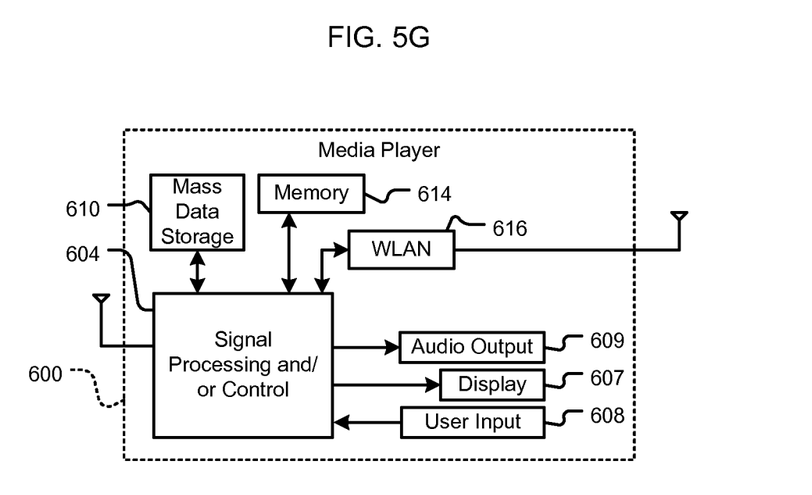

Referring now to FIG. 5G, embodiments of the present invention can be implemented in a media player 600. Embodiments of the present invention may implement either or both signal processing and/or control circuits, which are generally identified in FIG. 5G at 604, a WLAN interface and/or mass data storage of the media player 600. In some implementations, the media player 600 includes a display 607 and/or a user input 608 such as a keypad, touchpad and the like. In some implementations, the media player 600 may employ a graphical user interface (GUI) that typically employs menus, drop down menus, icons and/or a point-and-click interface via the display 607 and/or user input 608. The media player 600 further includes an audio output 609 such as a speaker and/or audio output jack. The signal processing and/or control circuits 604 and/or other circuits (not shown) of the media player 600 may process data, perform coding and/or encryption, perform calculations, format data and/or perform any other media player function.

The media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices (for example, hard disk drives [HDDs] and/or DVDs). At least one HDD may have the configuration shown in FIG. 5A and/or at least one DVD may have the configuration shown in FIG. 5B. The HDD may be a mini HDD that includes one or more platters having a diameter that is smaller than approximately 1.8". The media player 600 may be connected to memory 614 such as RAM, ROM, nonvolatile memory such as flash memory and/or other suitable electronic data storage. The media player 600 also may support connections with a WLAN via a WLAN network interface 616. In particular, processing and/or control circuits 604 may implement a USB host interface to communicate over a USB bus with a USB device interface in WLAN 616. Still other implementations in addition to those described above are contemplated.

Thus, embodiments of the present invention provides circuits, architectures, systems, methods, algorithms and software for reducing power consumption of a universal serial bus (USB) device. The embodiments generally measure a bus clock period, determine an application power save period for an application module, determine a bus power save period based on the application power save period and the bus clock period, send a power save request to a USB host, and enter a power saving mode of operation such that the power saving mode of operation has a duration based on the bus power save period. The power save request generally includes a value corresponding to the desired bus power save period. The present embodiments advantageously provide for reduced power consumption of a USB device and faster response during periodic states of activity and inactivity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   measuring, at a first device, a bus clock period, wherein the bus clock period corresponds to a wired communication bus connecting the first device to a second device;
   determining, at the first device, a first time period in which the first device is to enter a first reduced power mode;
   determining, at the first device, a second time period in which the wired communication bus is to enter a second reduced power mode, wherein the second time period is based on i) the first time period and ii) the bus clock period;
   sending, via the wired communication bus, a request from the first device to the second device, wherein the request is for the wired communication bus to enter the second reduced power mode during the second time period; and
   causing, at the first device, the first device to enter the first reduced power mode during the first time period in response to the first device receiving a reply to the request, wherein the reply is received from the second device via the wired communication bus.

2. The method of claim 1, wherein the request includes at least one value that indicates the second time period.

3. The method of claim 2, wherein the request includes a start time of the second time period and an end time of the second time period.

4. The method of claim 1, wherein determining the first time period is based on a third time period in which a third device is to enter a third reduced power mode, wherein the first device is connected to the third device via an interface separate from the wired communication bus.

5. The method of claim 4, further comprising causing, at the first device, the third device to enter the third reduced power mode in response to the first device receiving the reply.

6. The method of claim 5, wherein:
   the third device is a wireless local area network (WLAN) module having a radio frequency component; and
   causing the third device to enter the third reduced power mode comprises disabling the radio frequency component.

7. The method of claim 4, wherein:
   the third device is a wireless local area network (WLAN) module;
   the third time period is a delivery traffic indicator message (DTIM) beacon interval; and
   the first time period is determined to coincide with the DTIM beacon interval.

8. The method of claim 1, wherein:
   the wired communication bus is a Universal Serial Bus (USB);
   wherein causing the first device to enter the first reduced power mode includes causing a USB physical layer module of the first device to enter a high speed idle mode.

9. The method of claim 8, further comprising leaving, at the second device, the USB physical layer module in the high speed idle mode during the second time period.

10. The method of claim 1, further comprising suspending, at the second device, communication with the first device, via the wired communication bus, during the second time period.

11. The method of claim 1, further comprising causing the first device to enter an activity mode of operation after the first time period.

12. The method of claim 11, wherein measuring the bus clock period comprises measuring a period between start of frame (SOF) packets received from the second device via the wired communication bus.

13. The method of claim 1, further comprising exiting, at the first device, from the first reduced power mode after the first time period.

14. The method of claim 13, wherein exiting from the first reduced power mode is in response to the first device receiving a message from the second device via the wired communication bus.

15. The method of claim 13, wherein exiting from the first reduced power mode is in response to the first device receiving a message from a third device via an interface separate from the wired communication bus.

16. An apparatus, comprising:
   a bus interface device coupled to a wired communication bus, the bus interface device communicatively coupled to a first device via the wired communication bus, the bus interface device configured to
      measure a bus clock period of the wired communication bus,
      determine a first time period in which the bus interface device is to enter a first reduced power mode;
      determine, based on the first time period and the bus clock period, a second time period in which the wired communication bus is to enter a second reduced power mode,
      send a request to the first device via the wired communication bus, wherein the request is for the wired communication bus to enter the second power save mode for the second time period, and
      cause the bus interface device to enter the first reduced power mode for the first time period in response to the bus interface device receiving a reply to the request, the reply received by the bus interface device from the first device via the wired communication bus.

17. The apparatus of claim 16, wherein the request includes at least one value that indicates the second time period.

18. The apparatus of claim 17, wherein the request includes a start time of the second period and an end time of the second time period.

19. The apparatus of claim 16, wherein the bus interface device is configured to determine the first time period based on a third time period in which a second device is to enter a third reduced power mode, wherein the bus interface device is connected to the second device via an interface separate from the wired communication bus.

20. The apparatus of claim 19, wherein the bus interface device is configured to cause the second device to enter the third reduced power mode in response to the bus interface device receiving the reply.

21. The apparatus of claim 20, wherein:
the second device is a wireless local area network (WLAN) module having a radio frequency component; and
the bus interface device is configured to cause the WLAN module to enter the third reduced power mode at least by disabling the radio frequency component.

22. The apparatus of claim 19, wherein:
the second device is a wireless local area network (WLAN) module;
the third time period is a delivery traffic indicator message (DTIM) beacon interval; and
the bus interface device is configured to determine the first time period to coincide with the DTIM beacon interval.

23. The apparatus of claim 19, further comprising the second device.

24. The apparatus of claim 23, further comprising the first device.

25. The apparatus of claim 23, wherein the bus interface device is configured to measure the bus clock period at least by measuring a period between start of frame (SOF) packets received from the first device via the wired communication bus.

26. The apparatus of claim 16, wherein:
the wired communication bus is a Universal Serial Bus (USB);
the bus interface device includes a USB physical layer module; and
wherein the bus interface device is configured to cause the bus interface device to enter the first reduced power mode at least by causing the USB physical layer module to enter a high speed idle mode.

27. The apparatus of claim 26, further comprising the first device, wherein the first device is configured to leave the USB physical layer module in the high speed idle mode during the second time period.

28. The apparatus of claim 16, further comprising the first device, wherein the first device is configured to suspend communication with the bus interface device, via the wired communication bus, during the second time period.

29. The apparatus of claim 16, wherein the bus interface device is configured to exit from the first reduced power mode in response to the bus interface device receiving, via the wired communication bus, a message from the first device.

30. The apparatus of claim 16, wherein the bus interface device is configured to exit from the first reduced power mode in response to the bus interface device receiving, via an interface separate from the wired communication bus, a message from a second device.

\* \* \* \* \*